(12) United States Patent
Huh

(10) Patent No.: US 9,028,645 B2
(45) Date of Patent: *May 12, 2015

(54) METHOD OF MANUFACTURING SHOE USING MULTI-FUNCTIONAL PRIMER

(75) Inventor: Sung-Hwan Huh, Tangerang (ID)

(73) Assignee: HENKEL AG & CO. KGAA, Duesseldorf (DE)

( * ) Notice: Subject to any disclaimer, the term of this patent is extended or adjusted under 35 U.S.C. 154(b) by 593 days.

This patent is subject to a terminal disclaimer.

(21) Appl. No.: 13/399,011

(22) Filed: Feb. 17, 2012

(65) Prior Publication Data

US 2012/0144603 A1 Jun. 14, 2012

Related U.S. Application Data

(63) Continuation of application No. PCT/EP2010/061716, filed on Aug. 12, 2010.

(30) Foreign Application Priority Data

Aug. 17, 2009 (KR) .................. 10-2009-0075666

(51) Int. Cl.
| | |
|---|---|
| *A43B 13/04* | (2006.01) |
| *B29D 35/00* | (2010.01) |
| *B29D 35/12* | (2010.01) |
| *C08L 75/04* | (2006.01) |
| *C09J 107/00* | (2006.01) |
| *C09J 109/00* | (2006.01) |
| *C08L 9/00* | (2006.01) |

(52) U.S. Cl.
CPC ............ *A43B 13/04* (2013.01); *B29D 35/0054* (2013.01); *B29D 35/122* (2013.01); *C08L 9/00* (2013.01); *C08L 75/04* (2013.01); *C09J 107/00* (2013.01); *C09J 109/00* (2013.01)

(58) Field of Classification Search
CPC ........................................................ A43B 13/04
USPC ............................... 156/325; 12/142, 142 RS
See application file for complete search history.

(56) References Cited

U.S. PATENT DOCUMENTS

| | | | |
|---|---|---|---|
| 3,917,742 A | 11/1975 | Harlan, Jr. | |
| 7,910,656 B2 | 3/2011 | Lutz et al. | |
| 8,479,336 B2 * | 7/2013 | Huh ......................... | 12/142 RS |
| 2005/0209401 A1 | 9/2005 | Lutz et al. | |
| 2006/0276601 A1 | 12/2006 | Lutz et al. | |
| 2008/0045670 A1 | 2/2008 | Lutz et al. | |

FOREIGN PATENT DOCUMENTS

| | | |
|---|---|---|
| KR | 100191275 B1 | 6/1999 |
| KR | 20000063527 A | 11/2000 |
| WO | 9903907 A1 | 1/1999 |

* cited by examiner

*Primary Examiner* — Michael Nicholas Orlando
*Assistant Examiner* — Daniel Lee
(74) *Attorney, Agent, or Firm* — Sun Hee Lehmann

(57) ABSTRACT

The present invention provides a method of manufacturing a shoe using a multifunctional primer, comprising the steps of coating a rubber outsole made of unvulcanized rubber with a liquid multifunctional primer comprising a polyurethane dispersion, a butadiene rubber solution, and a natural rubber solution; vulcanizing the unvulcanized rubber outsole coated with the multifunctional primer, thermally activating the coated vulcanized rubber outsole; coating the thermally-activated rubber outsole with an adhesive; and attaching the rubber outsole to a variety of other parts.

9 Claims, No Drawings

METHOD OF MANUFACTURING SHOE USING MULTI-FUNCTIONAL PRIMER

CROSS-REFERENCE TO RELATED APPLICATIONS

This application is a continuation of International Patent Application No. PCT/EP2010/061716 filed Aug. 12, 2010, which claims priority to Korean Patent Application No. 10-2009-0075666 filed Aug. 17, 2009, the contents of both of which are incorporated herein by reference.

The present invention relates to a method of manufacturing a shoe using a multifunctional primer, and, more particularly, to a method of manufacturing a shoe in an environmentally friendly manner at a high rate of production using a liquid multifunctional primer having excellent adhesion.

DESCRIPTION OF THE RELATED ART

Generally, a rubber outsole is prepared by vulcanizing unvulcanized rubber which is cut into a planar or structured shape. Examples of conventional technologies related to this rubber outsole preparation method are disclosed in Korean Patent Registration No. 10-0191275 and Korean Unexamined Patent Application Publication No. 2000-0063527.

Korean Patent Registration No. 10-0191275 discloses a method of integrally forming a rubber outsole of a shoe and a polyurethane midsole, including the steps of: forming a rubber outsole such that a band-shaped projecting part having a predetermined width is provided over the entire periphery thereof and reticularly-arranged protrusions are formed on the surface thereof; heat-treating the rubber outsole such that the surface temperature thereof is about 40 to 50° C.; and spraying an undiluted polyurethane solution onto the heat-treated rubber outsole to integrally form a midsole on the rubber outsole. Further, Korean Unexamined Patent Application Publication No. 2000-0063527 discloses a shoe outsole and a method of manufacturing the same in which the outsole and midsole are simultaneously formed and attached through a single process.

As known conventionally a mold to form a rubber outsole is treated with a release agent in order to prevent the rubber outsole formed through a press process from sticking to the surface of the mold. As the release agent inhibits the rubber outsole from being attached to other adherends, it must be removed.

In these methods, since a rubber outsole of a shoe is formed using a liquid rubber primer, the rubber outsole has to be prepared before further processing by a washing and priming processes. Therefore, after the formation of the rubber outsole, in the washing process, a washing machine and a washing solution are additionally used in order to wash the rubber outsole. Thereafter in the priming process, a two-pack rubber primer including chloride powder and an organic solvent is used in order to treat the rubber outsole, and the two-pack rubber primer is directly applied on the surface of the rubber outsole through manual procedures. During this priming process, workers are required to wear their protectors for safety. In order to manufacture a shoe, the rubber outsole prepared in this way is coated with an adhesive, dried, and is then attached to a variety of shoe parts such as a midsole, an insole, an upper and the like.

SUMMARY OF THE INVENTION

Therefore, the present invention has the object to replace a conventional two-pack rubber primer which was required to be washed, before further use and to manufacture a shoe at low cost by simplifying a complicated shoe manufacturing process.

Accordingly, an object of the present invention is to provide a method of manufacturing a shoe, in which the shoe can be simply and efficiently manufactured using a multifunctional primer which improves the adhesion between a rubber outsole and an adherend and which primer layer is not required to be washed before further use. Additionally a conventional two-pack rubber primer can be replaced.

In order to accomplish the above object, an aspect of the present invention provides a method of manufacturing a shoe using a multifunctional primer, including the steps of coating a rubber outsole made of unvulcanized rubber with a liquid multifunctional primer comprising a polyurethane dispersion, a natural rubber solution and butadiene rubber solution; vulcanizing the unvulcanized rubber outsole coated with the multifunctional primer, thermally activating the vulcanized rubber outsole, coating the thermally-activated rubber outsole with an adhesive optionally drying the rubber outsole coated with the adhesive; and attaching the rubber outsole to a variety of shoe parts such as a midsole, an insole, an upper and the like.

The method of manufacturing a shoe using a multifunctional primer, may further include the step of disposing a protective sheet on the unvulcanized rubber outsole coated with the multifunctional primer according to the invention.

The protective sheet may include different non adherend materials, specifically any film material selected from the group consisting of silicon paper, PET film and high-density PP film.

Another embodiment of the invention includes the use of a multifunctional primer manufactured out of a first solution comprising 15 to 55 parts by weight of natural rubber and 750 to 1350 parts by weight of an organic solvent; a second solution comprising 100 parts by weight of the first solution and 45 to 90 parts by weight of a polyurethane-dispersion; and a third solution being the multifunctional primer comprising 100 parts by weight of the second solution and 100 to 250 parts by weight of a butadiene-based rubber solution containing 50 to 200 parts by weight of a butadiene rubber and 800 to 950 parts by weight of an organic solvent to manufacture a primer layer in a method according to the invention.

The composition of the primer may further comprise 10 to 20 parts by weight of a surfactant added to the second solution.

DESCRIPTION OF THE PREFERRED EMBODIMENTS

Hereinafter, preferred embodiments of the present invention will be described in detail.

As described above, the present invention provides a method of manufacturing a shoe using a multifunctional primer, including the steps of coating a rubber outsole made of unvulcanized rubber which is cut into a planar or structured shape with a liquid multifunctional primer including a polyurethane dispersion and a rubber composition, vulcanizing the unvulcanized rubber outsole coated with the multifunctional primer, thermally activating the vulcanized rubber outsole, coating the thermally-activated rubber outsole with an adhesive and then drying the rubber outsole coated with the adhesive, and attaching the rubber outsole to a variety of shoe parts such as a midsole, an insole, an upper and the like.

The multifunctional primer of the present invention can be used as far as it is known in the related art to be a material which can ensure compatibility and good adhesion between a vulcanized rubber outsole and a polyurethane adhesive which are different from each other in its chemical composition. Preferably, the mixing ratio of the components of the multifunctional primer is set through several experiments to ensure that the multifunctional primer is optimally compatible with both the two materials. The primer shall provide an excellent contact and bonding to the outsole surface and additionally a bonding to the adhesive material. Without being limited by a theory this may be performed by a penetration of parts of the primer in the surface of both substrate materials. Therefore, when the multifunctional primer was not mixed in the optimal ratio, for example, when it includes too much or too little of a specific component, the compatibility between the multifunctional primer and adhesive is deteriorated, and thus the stability of products is also deteriorated.

The multifunctional primer used in the present invention comprises three kinds of major components, such as a natural rubber solution, a polyurethane dispersion and a butadiene-based rubber solution.

The natural rubber solution (hereinafter, referred to as a "first solution") comprises 15 to 55 parts by weight of natural rubber and 750 to 1350 parts by weight of an organic solvent. When the amount of the natural rubber is less than 15 parts by weight, the compatibility between the multifunctional primer and the rubber outsole is deteriorated. When the amount thereof is more than 55 parts by weight, the compatibility between the multifunctional primer and the polyurethane adhesive is deteriorated. As organic solvents such solvents can be used which dissolve natural rubber, which are typically non-polar solvents. Examples of such organic solvent may include, but are not limited to, naphtha solvents, petroleum solvent and mixtures thereof.

In the present invention, the polyurethane dispersion is used in an amount of 45 to 90 parts by weight based on 100 parts by weight of the first solution. This mixture of polyurethane-dispersion and natural rubber solution is referred to as "a second solution". When the amount of the polyurethane dispersion is less than 45 parts by weight, the compatibility between the multifunctional primer and the polyurethane adhesive is deteriorated. When the amount thereof is more than 90 parts by weight, the compatibility between the multifunctional primer and the rubber outsole is deteriorated. In this case, the second solution may further comprise 10 to 20 parts by weight of surfactant to ensure the homogeneity between the two components.

100 parts by weight of the second solution prepared in this way is mixed with 100 to 250 parts by weight of a butadiene-based rubber solution containing 50 to 200 parts by weight of a butadiene rubber and 800 to 950 parts by weight of an organic solvent to prepare a third solution which is the multifunctional primer. Examples of the butadiene-based rubber may include butadiene rubber, acrylonitrile-butadiene rubber, styrene-butadiene-styrene rubber, and the like. When the amount of the butadiene-based rubber is less than 50 parts by weight, compatibility between the multifunctional primer and the rubber outsole is deteriorated. When the amount thereof is more than 200 parts by weight, compatibility between the multifunctional primer and the polyurethane adhesive is deteriorated. Examples of the organic solvent may include, but are not limited to, hydrocarbon solvents, especially aromatic hydrocarbon solvents, for example toluene and the like. The primer may additionally contain additives, which are used to modify the application properties, for example resins, catalysts, surfactants, adhesion promoters or the like. A man skilled in the art can easily select such additives.

The multifunctional primer of the present invention compromises 100 parts by weight of the second solution and 100 to 250 parts by weight of the butadiene-based rubber solution. When the amount of the butadiene-based rubber solution is less than 100 parts by weight, the compatibility between the multifunctional primer and the rubber outsole is deteriorated. When the amount thereof is more than 250 parts by weight, the compatibility between the multifunctional primer and the polyurethane adhesive is deteriorated.

According to an embodiment of the present invention, a method of preparing the multifunctional primer using the three kinds of major components thereof, such as the natural rubber solution, polyurethane dispersion and butadiene-based rubber solution, which constitute the multifunctional primer, will now be described.

1. Preparation of a Butadiene-Based Rubber Solution

The solute, butadiene-based rubber, is mixed with an organic solvent, and then the mixture is stirred until the polymer is completely dissolved in the organic solvent.

2. Preparation of a Natural Rubber Solution

Natural rubber, which is a solute, is mixed with an organic solvent, and then the mixture is stirred until the polymer is completely dissolved in the organic solvent.

3. Preparation of a Multifunctional Primer

As polyurethane dispersion all dispersions can be used which contain thermoplastic polyurethanes, water as solvent and optionally additives which may improve stability and are useful to manufacture such dispersions. Such polyurethane dispersions are commercially available.

First, the prepared natural rubber solution is mixed with a polyurethane dispersion. After about 10 minutes, this mixture is slowly mixed with the prepared butadiene-based rubber solution and then stirred for about 30 minutes to prepare the multifunctional primer.

The multifunctional primer prepared in this way may be used to attach rubber based materials to other substrates like tires, fabrics, textiles and the like, especially a rubber outsole of a shoe to other substrates.

As first step of the method according to the invention the multifunctional primer is applied on an unvulcanized rubber outsole and then vulcanized in a mold, thus forming a vulcanized rubber outsole coated with a layer of the multifunctional primer. The primer can be applied by kown means, for example spraying, brushing, painting. It shall form a layer of up to 1 mm on that part of the sole which shall be bonded to other substrates. Solvents may evaporate from the surface of the layer. For the vulcanizing step, in order to prevent the multifunctional primer from being brought into contact with the inner surface of the mold, it is preferred to cover the layer of the multifunctional primer with a protective sheet. Examples of the protective film may include silicon paper, PET film, high-density PP film and the like. After taking the vulcanized rubber part out of the mold it can be stored or immediately further processed.

Before further processing the protective film shall be separated from the sole. So according to the method of the invention a surface of the rubber outsole is provided which is coated by a primer layer. A surface is provided which is clean and does not need to be cleaned. Subsequently, the layer of the multifunctional primer on the vulcanized rubber outsole is thermally activated under conventional rubber drying conditions (for example, at 45 to 55° C. for 90 to 120 seconds). After such activation the outsole is coated with an adhesive. Optionally the adhesive layer will be dried. Then a variety of shoe parts such as a midsole, an insole, an upper part and the like can be attached to the outsole. To improve the formation of the adhesive bond it may be useful to apply pressure or to set the adhesive by elevated temperature.

Hereinafter, the present invention will be described in more detail through the following Examples. However, the scope of the present invention is not limited thereto.

Example 1

1. Preparation of the Butadiene-Based Rubber Solution 150 parts of butadiene-based rubber (UBE150, manufactured by UBE Industries Ltd.), which was a solute, was mixed with 150 parts by weight of toluene, and then the mixture was stirred until the solute was completely dissolved in the toluene.

2. Preparation of a Natural Rubber Solution 40 parts by weight of natural rubber (SIR3L, manufactured by Asia Rubber Industries Ltd.), which was a solute, was mixed with a mixed solvent including 560 parts by weight of a naphtha solvent (Honasol), 240 parts by weight of cyclohexane and 160 parts by weight of a petroleum-based solvent (HS-120), and then the mixture was stirred until the solute was completely dissolved in the mixed solvent.

3. Preparation of a Multifunctional Primer 495 parts by weight of a natural rubber solution, 495 parts by weight of a polyurethane dispersion (U-54, manufactured by Bayer Industries Ltd.) and 10 parts by weight of a surfactant (OP-1050) were mixed. After about 10 minutes, 333 parts by weight of this mixture was slowly mixed with 333 parts by weight of the prepared butadiene-based rubber solution, and then stirred for about 30 minutes to prepare a multifunctional primer.

Example 2

The liquid multifunctional primer prepared in Example 1 was uniformly applied on the unvulcanized rubber outsole (adherend) to have a thickness of about 0.1 mm using a brush, and then a rubber vulcanization process was performed under the conditions of 160° C. 115 kg/cm2 and 420 seconds. In this case, in order to prevent the multifunctional primer from being brought into contact with the inner surface of the mold, the unvulcanized rubber outsole coated with the multifunctional primer was covered with the protective sheet.

The vulcanized rubber outsole, to which the multifunctional primer was transferred, was thermally activated in a heating chamber at a temperature of 45 to 55° C. for about 100 seconds, coated with an adhesive (AQUQCE W-01, aqueous, commercially available from PT.Dongsung NSC), and was then thermally dried at a temperature of 55 to 65° C. for about 100 seconds. Thereafter, the thermally-dried rubber outsole was manually attached to a midsole and an upper and then further attached using a hydraulic walled sole attaching machine to manufacture a shoe.

Comparative Example 1

In order to compare the method of manufacturing a show using the multifunctional primer of Example 1 with a conventional shoe manufacturing method, the conventional shoe manufacturing method was conducted as follows.

After a release agent was applied on the inner surface of a mold for molding unvulcanized rubber, unvulcanized rubber was charged in the mold, and was then formed into a vulcanized rubber outsole through a rubber vulcanization process under the vulcanizing conditions of 160° C., 115 kg/cm² and 420 seconds. Subsequently, the vulcanized rubber outsole was washed using a washing machine provided with three different kinds of detergents and having a diameter of 15 to 20 m, and then thermally dried.

Then, the thermally-dried rubber outsole was manually coated with a previously-prepared two-pack rubber primer (AQUACE PR-505, aqueous, commercially available from PT.Dongsung NSC). The two-pack rubber primer was prepared by mixing a powdered solute in a solvent, and was used after the powdered solute was completely dissolved in the solvent. During this priming process, the workers using the two-pack rubber primer are required to wear their protectors for safety. Subsequently, the rubber outsole coated with the two-pack rubber primer was further thermally dried completely.

Thereafter, the completely dried rubber outsole was coated with an adhesive (AQUQCE W-01, aqueous, commercially available from PT.Dongsung NSC), and was then thermally dried at a temperature of 55 to 65° C. for about 170 seconds. Then, the thermally-dried rubber outsole was manually attached to a midsole and an upper and then further attached using a hydraulic walled sole attaching machine to manufacture a shoe.

Experimental Tests

The rubber outsole was attached to an upper and a midsole using the multifunctional primer of Example 1. After 24 hours, a peeling test was conducted using a tension machine (INSTRON 4443) to measure the adhesivity between the rubber outsole and the upper and between the rubber outsole and the midsole. In addition, the measurement of the adhesive force was conducted using the test sample obtained from Comparative Example 1. The results thereof are given in Table 1.

TABLE 1

| Class. | | Example 1 | Comparative Example 1 |
|---|---|---|---|
| Adhesivity[1] (kg/cm) | adhesivity between rubber outsole and upper | 4.0 to 6.0 (upper is damaged) | 3.5 to 5.5 (upper is damaged) |
| | adhesivity between rubber outsole and midsole | 4.0 to 6.0 | 3.5 to 5.5 |

As given in Table 1, it can be seen that the test example using the multifunctional primer according to the present invention has adhesivity equal to or greater than the conventional test sample (Comparative Example 1)

As described above, the method of manufacturing a shoe according to the present invention, compared to conventional shoe manufacturing methods, is advantageous in that processes of washing and priming a rubber outsole need not be conducted, thus improving productivity. Further, the method of manufacturing a shoe according to the present invention is advantageous in that production costs can be reduced by decreasing the number of workers and facilities due to the omission of the washing and priming processes and in that a shoe can be manufactured in an manner friendly to the environment due to the omission of the washing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing a shoe using a multifunctional primer, comprising the steps of:
    coating a rubber outsole made of unvulcanized rubber with a liquid multifunctional primer comprising a polyurethane dispersion, a butadiene rubber solution, and a natural rubber solution;
    vulcanizing the unvulcanized rubber outsole coated with the multifunctional primer;
    thermally activating the coated vulcanized rubber outsole;
    coating the thermally-activated rubber outsole with an adhesive; and
    attaching the rubber outsole to a variety of other parts.

2. The method according to claim 1 wherein after application of the primer layer the solvents may evaporate partly or totally.

3. The method according to claim 1, further comprising the step of disposing a protective sheet on the layer of the non-cured multifunctional primer on top of the unvulcanized rubber outsole.

4. The method according to claim 3, wherein the protective sheet includes a material selected from the group consisting of silicon paper, PET film and high-density PP film.

5. The method according to claim 1 wherein the adhesive applied to the activated rubber outsole is allowed to dry.

6. The method according to claim 1 wherein the other parts are selected from midsole, insole, an upper part and the like.

7. The method of manufacturing a shoe using a multifunctional primer according to claim 1,
    wherein the multifunctional primer consists of a third solution,
    such third solution comprising 100 parts by weight of a second solution and 100 to 250 parts by weight of a butadiene-based rubber solution containing 50 to 200 parts by weight of a butadiene rubber and 800 to 950 parts by weight of an organic solvent, the second solution comprising 100 parts by weight of a first solution and 45 to 90 parts by weight of a polyurethane-dispersion; and
    the first solution comprising 15 to 55 parts by weight of natural rubber and 750 to 1350 parts by weight of an organic solvent.

8. The method of manufacturing a shoe using a multifunctional primer according to claim 7, wherein the second solution further comprises 10 to 20 parts by weight of a surfactant.

9. The method of manufacturing a shoe using a multifunctional primer according to claim 7, wherein the butadiene-based rubber is selected from the group consisting of butadiene rubber, acrylonitrile-butadiene rubber and styrene-butadiene-styrene rubber.

* * * * *